US009882997B2

(12) United States Patent
Monighetti

(10) Patent No.: US 9,882,997 B2
(45) Date of Patent: *Jan. 30, 2018

(54) METHODS AND APPARATUS TO MONITOR ONLINE ACTIVITY

(71) Applicant: THE NIELSEN COMPANY (US), LLC, New York, NY (US)

(72) Inventor: Brian T. Monighetti, San Ramon, CA (US)

(73) Assignee: The Nielson Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,265

(22) Filed: Oct. 5, 2015

(65) Prior Publication Data
US 2016/0028839 A1 Jan. 28, 2016

Related U.S. Application Data

(63) Continuation of application No. 13/689,278, filed on Nov. 29, 2012, now Pat. No. 9,154,565.

(51) Int. Cl.
*H04L 29/08* (2006.01)
*H04L 29/06* (2006.01)

(52) U.S. Cl.
CPC ............ *H04L 67/22* (2013.01); *H04L 67/306* (2013.01); *H04L 69/22* (2013.01)

(58) Field of Classification Search
CPC ........ H04L 67/22; H04L 69/22; H04L 67/306
USPC ...................................................... 709/224
See application file for complete search history.

(56) References Cited

U.S. PATENT DOCUMENTS

| 5,675,510 | A | 10/1997 | Coffey et al. |
| 6,108,637 | A | 8/2000 | Blumenau |
| 6,389,429 | B1 | 5/2002 | Kane et al. |
| 6,829,368 | B2 | 12/2004 | Meyer et al. |
| 6,941,003 | B2 | 9/2005 | Ziesig |
| 7,734,722 | B2 | 6/2010 | Seidl et al. |
| 8,175,617 | B2 | 5/2012 | Rodriguez |
| 9,154,565 | B2 | 10/2015 | Monighetti |

(Continued)

OTHER PUBLICATIONS

United States Patent and Trademark Office, "Notice of Allowance," issued in connection with U.S. Appl. No. 13/689,278, dated Jun. 1, 2015, 16 pages.

(Continued)

*Primary Examiner* — Tu Nguyen
(74) *Attorney, Agent, or Firm* — Hanley, Flight & Zimmerman, LLC

(57) ABSTRACT

Methods and apparatus are disclosed to monitory online activity. An example method includes collecting first uniform resource locators from a first client device having a meter. The example method also includes collecting second uniform resource locators from a second client device not having a meter. The example method also includes determining that ones of the second uniform resource locators from the second client device correspond to online activity of a user associated with the first client device based on ones of the first uniform resource locators matching at least portions of the ones of the second uniform resource locators. Additionally, the example method includes associating the second client device with the user of the first client device.

14 Claims, 7 Drawing Sheets

(56) References Cited

U.S. PATENT DOCUMENTS

| | | |
|---|---|---|
| 2008/0250136 A1* | 10/2008 | Izrailevsky ............. H04L 67/22 709/224 |
| 2010/0268540 A1 | 10/2010 | Arshi et al. |
| 2011/0202270 A1 | 8/2011 | Sharma et al. |
| 2011/0208850 A1 | 8/2011 | Sheleheda et al. |
| 2012/0084206 A1 | 4/2012 | Mehew et al. |
| 2012/0084828 A1 | 4/2012 | Rowe et al. |
| 2012/0109756 A1 | 5/2012 | Kim et al. |
| 2013/0005296 A1 | 1/2013 | Papakostas et al. |
| 2014/0136333 A1* | 5/2014 | Shoshitaishvili .. G06Q 30/0269 705/14.66 |
| 2014/0149577 A1 | 5/2014 | Monighetti |

OTHER PUBLICATIONS

United States Patent and Trademark Office, "Non-Final Office Action," issued in connection with U.S. Appl. No. 13/689,278, dated Jan. 12, 2015, 17 pages.

\* cited by examiner

METHODS AND APPARATUS TO MONITOR ONLINE ACTIVITY

RELATED APPLICATION

This patent arises as a continuation of U.S. patent application Ser. No. 13/689,278, filed Nov. 29, 2012, issued as U.S. Pat. No. 9,154,565, issued Oct. 6, 2015, which is hereby incorporated by reference in its entirety.

FIELD OF THE DISCLOSURE

The present disclosure relates generally to audience measurement and, more particularly, to methods and apparatus to monitor online activity.

BACKGROUND

To track Internet usage, media measurement entities sometimes recruit panel members that consent to having their Internet activity monitored. Some monitoring is done by installing a meter on a panelist's computer. The meter logs visits to websites and/or other Internet activity in Internet activity logs, and reports collected Internet activity logs to a data center from time to time.

DETAILED DESCRIPTION

Figure 1:
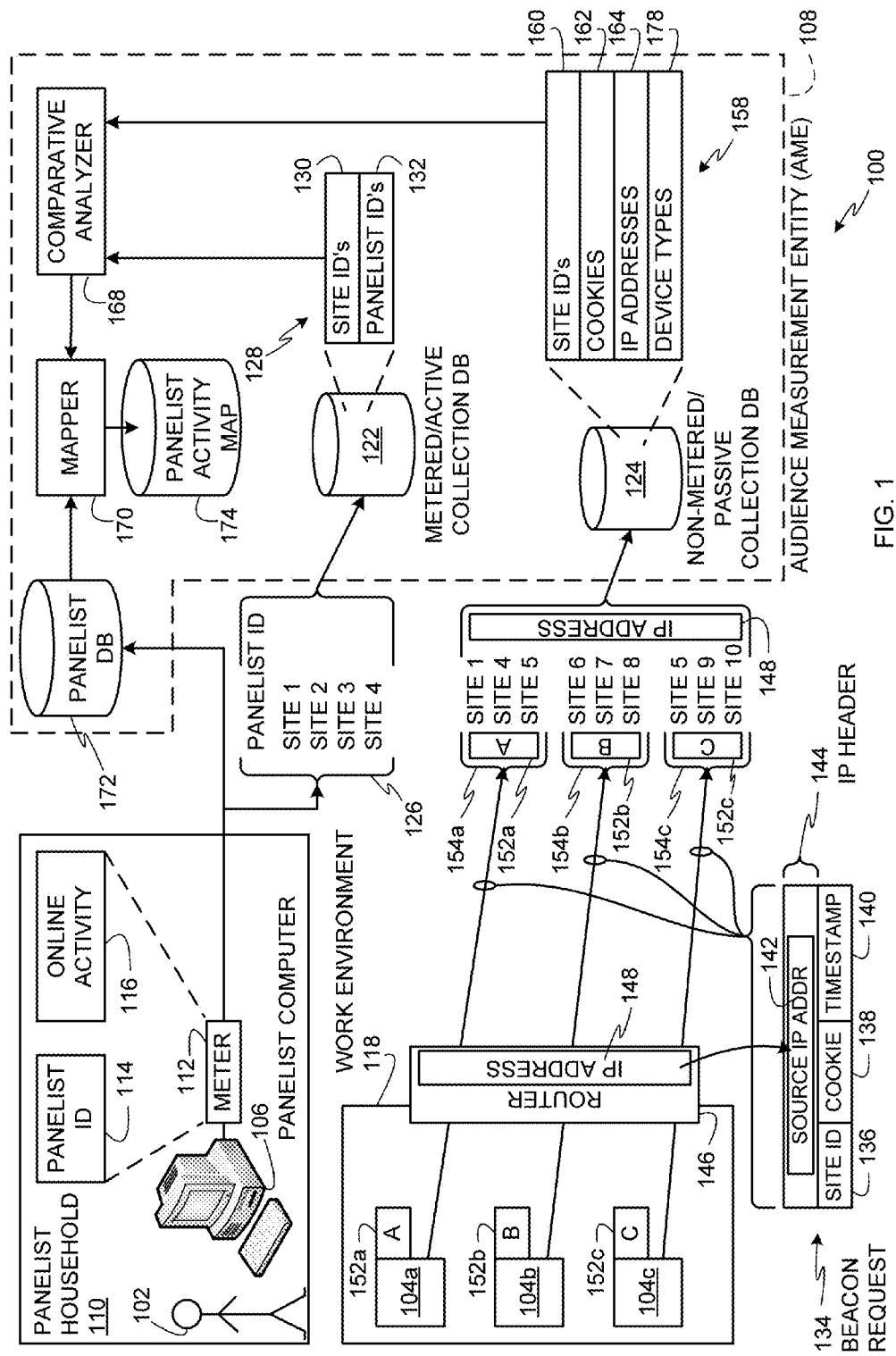
FIG. 1 depicts an example system constructed in accordance with the teachings of this disclosure to monitor online activities of panel members on non-metered secondary devices.

Examples methods, apparatus, and articles of manufacture disclosed herein enable monitoring online activity.

Disclosed examples enable monitoring online activity (e.g., Internet activity) over prolonged durations (e.g., weeks, months, etc.) and/or across multiple devices at which Internet usage meters are not installable and/or at which cookies to identify users cannot consistently be relied upon. Example devices include, for example, computers (stationary or mobile), smart televisions, gaming consoles, Internet appliances, mobile devices such as mobile phones, smart phones, tablet devices (e.g., an Apple® iPad® tablet device), multi-media phones, etc. Examples disclosed herein may be used to provide media providers (e.g., movie producers/distributors, music producers/distributors, television networks, online information publishers, website owners, ad publishers, streaming media providers, etc.) with online activity behaviors, online activity trends, media exposure information, etc. to enable such media providers to make more informed decisions about what types of media to provide, where to spend advertising dollars, how to distribute media/advertisements, etc. Such examples are beneficial to media networks, website owners, marketers, product manufacturers, service companies, advertisers, and/or any other individual or entity that distributes or publishes media over the Internet. In addition, consumers benefit from more appealing media offerings, more efficient advertising (e.g., ads more relevant to the consumer interests), and/or more appealing programming sponsored by advertisers.

Prior systems for tracking Internet usage sometimes install meters (e.g., hardware and/or software meters) on home computers (e.g., panelist home computers) of consumers (e.g., panel members) that consent to having their Internet activity monitored. As panel members engage in their online activities at their home computers, the installed meters generate online activity logs to store information collected about accessed websites and/or other online activities. The meters then send the Internet activity logs to data collection centers for storage and/or analysis. While having meters installed at home computers facilitates monitoring Internet activities of panelists on their home computers, such meter-based techniques are often not useable to monitor the activities of panelists on secondary devices within or outside the home (e.g., work computers, library computers, school computers, tablets, mobile phones, mobile devices, etc.). For example, work computers and computers located at other institutions are often governed by corporate-wide IT (information technology) policies that prohibit installing unauthorized third-party hardware and/or software such as Internet usage meters. In some instances, anti-virus software on corporate computers will seek and uninstall third-party software such as Internet usage meters. In addition, meters may often times not be readily installable on closed systems such as mobile devices and tablet computers. For example, tablets, mobile phones, and/or other mobile devices that use services from telecommunication service carriers (e.g., wireless network service providers) are often governed by IT policies, software restrictions, hardware restrictions, etc. of carriers and/or device manufacturers. As such, Internet activities of panelists from work computers or closed system devices cannot be tracked using installed meters.

Examples disclosed herein enable monitoring online activities of panelists when they access the Internet using non-metered secondary devices (e.g., work computers, library computers, school computers, tablets, mobile phones, mobile devices, etc.). Disclosed examples to monitor Internet activities of panelists on non-metered secondary devices involves uniform resource locator (URL) analyses, in which a panelist's frequently visited websites from a home metered computer are compared to frequently visited websites of unknown users on non-metered secondary devices to determine online activity from the non-metered secondary devices that corresponds to the panelist. In disclosed examples, a URL usage profile is created for each home panelist based on their monitored Internet activities from their metered home computer. In addition, browsing activities of non-metered secondary devices (e.g., work computers) are monitored to generate non-metered online activity logs based on the browsing activities at the non-metered secondary devices. The visited websites for non-metered online activity logs are then compared to visited websites collected in the metered online activity logs of different home panelists. High-probability matches between the non-metered online activity logs and the metered online activity logs are then identified. For each high-probability match, cookie ID(s) of one or more non-metered secondary devices are mapped to the matching home panelist in a mapping table. In some examples, the matching process between website visits from non-metered secondary devices and metered panelist computers is done from time to time to re-map any new secondary device cookie IDs resulting from users or browsers deleting cookies (e.g., when a user logs off or turns of a computer at the end of a work day or at any other time) and new cookies being set. In this manner, the mappings of secondary device cookies to home panelists can be dynamically updated to follow the home panelists even when secondary device cookies change from time to time.

To collect online activities of persons at secondary devices (e.g., work computers located in enterprise environments in which Internet usage meters are not installable) disclosed examples use media tagging techniques. In disclosed examples, media tagging facilitates monitoring users' visits to websites that have been tagged with beacon code for use by an audience metering entity (AME) in monitoring Internet activity. Online media tagging techniques involve inserting beacon instructions in a webpage that are downloaded along with (and/or refer to a link in) the contents of the webpage to a device browser. The browser then executes the beacon instructions when the webpage is constructed at the browser. The instructions cause the browser to send a beacon request to a data collection server. The beacon request includes user identifier information (e.g., a cookie or other unique identifier) identifying the particular browser or device sending the beacon request and the URL of the website causing the beacon request. In this manner, the beacon request causes the data collection server to log a website visit by storing the received user identifier information in association with the URL of the particular website that caused the beacon request to be sent. For each secondary device cookie ID, a corresponding non-metered online activity log is generated at the data collection server. In this manner, using media tagging techniques, a data collection server logs website visits (e.g., logs URL's of websites) in association with respective secondary device cookie IDs. Each secondary device cookie ID represents a particular unknown user at a secondary device. In some examples, more than one secondary device cookie ID represents the same unknown user when a secondary device of the unknown user frequently deletes its cookie ID, resulting in the AME setting frequently setting a new cookie ID at the secondary device.

FIG. 1 depicts an example system 100 to monitor online activities of panel audience members (e.g., a panel audience member 102) on one or more non-metered secondary devices 104a-c. In the illustrated example of FIG. 1, online activity of a panel audience member 102 (i.e., a panelist 102) is monitored at a panelist computer 106 and at one or more non-metered secondary devices 104a-c. The panel member 102 of the illustrated example is a person recruited by an audience measurement entity (AME) 108 (e.g., The Nielsen Company) to become part of an audience measurement panel and participate in audience measurement market research. To participate in the audience measurement panel, the panel member 102 provides personal information (e.g., demographic information) to be stored by the AME 108 in association with information (e.g., a panelist ID) identifying the panel member 102. In addition, the panel member 102 agrees to allow the AME 108 to monitor her/his online activities for the duration of the agreement.

In the illustrated example, the panel member 102 resides in a panelist household 110 at which the panelist computer 106 is located. When the panel member 102 joins the audience measurement market research program implemented by the AME 108, the AME 108 installs an example meter 112 on the panelist computer 106. The meter 112 of the illustrated example stores a panelist identifier (ID) 114 and collects online activity 116. The online activity 116 of the illustrated example includes information (e.g., site ID's) indicative of websites visited using the panelist computer 106. From time-to-time, or continuously, the meter 112 reports or sends the panelist ID 114 and the online activity 116 to the AME 108. The meter 112 of the illustrated example may be a software meter installed in the panelist computer 106, a hardware meter connected to or installed in the panelist computer 106, or a combination of software and hardware operating jointly to implement the meter 112.

In the illustrated example, the AME 108 can use the information collected by the meter 112 to determine the online activities of the panel member 102 based on the panelist ID 114 stored at the meter 112. However, when the panel member 102 uses a non-metered secondary device (e.g., one or more of the non-metered secondary devices 104a-c) that does not have a meter (e.g., the meter 112), the online activity of the panel member 102 is not readily collectible using prior techniques because such non-metered secondary device(s) do(es) not store the panelist ID 114. Therefore, when using non-metered secondary devices to access the Internet, identities of panel members (e.g., the panel member 102) are not available to the AME 108 and, thus, the online activities of such panel members on non-metered secondary devices cannot be tracked using prior techniques. Examples disclosed herein enable the AME 108 to identify panel members (e.g., the panel member 102) when the panel members access the Internet using non-metered secondary devices (e.g., one or more of the non-metered secondary devices 104a-c).

In the illustrated example of FIG. 1, the one or more non-metered secondary devices 104a-c is/are used by the panel member 102 in a work environment 118 (e.g., a corporate office or other work area). Others of the non-metered secondary devices 104a-c not used by the panel member 102 are used by other persons in the work environment 118 which may or may not be panel members of an audience panel managed by the AME 108. The non-metered secondary devices 104a-c may be computers, tablet devices, mobile phones, and/or any other device capable of accessing the Internet (e.g., a smart television, a gaming console, an Internet appliances, etc.). In illustrated examples disclosed herein, the non-metered secondary devices 104a-c are referred to as non-metered, because they do not have a meter, such as the meter 112 installed at the panelist household 110. However, example techniques disclosed herein enable monitoring Internet activity on the non-metered secondary device 104a-c without a meter (e.g., the meter 112) installed at those secondary devices 104*a-c*. Thus, the term "non-metered" refers to not having a meter (e.g., not having the meter 112), and the term "secondary" refers to the devices 104*a-c* being secondary devices relative to the panelist computer 106, which is the primary device on which the AME 108 collects online activity via the meter 112.

Although the panelist 102 has been described as using one or more of the non-metered secondary devices 104*a-c*, the AME 108 is unaware of exactly which of the non-metered secondary devices 104*a-c* is used by the panelist 102. For example, the work environment 118 may be governed by a strict corporate and/or information technology (IT) policy that prohibits the AME 108 from installing any type of software and/or hardware meters on the non-metered secondary devices 104*a-c*. In the illustrated example, to determine the online activity of the panel member 102 when at the work environment 118, the AME 108 performs comparative analyses between URL's visited by the panelist 102 via the panelist computer 106 and URL's visited via the non-metered secondary client devices 104*a-c* at the work environment 118. The AME 108 then determines that online activity of the panelist 102 from the work environment 118 corresponds to online activity logs collected from the work environment 118 having sufficiently similar URL's to URL's visited via the panelist computer 106. In some examples, the panelist 102 uses only one of the non-metered secondary devices 104*a-c* (e.g., the panelist 102 uses only a desktop computer at work), and other people in the work environment use others of the non-metered secondary devices 104*a-c*. In other examples, the panelist 102 uses more than one of the non-metered secondary devices 104*a-c*. For example, the panelist 102 may use an office computer, a laboratory computer, a tablet device connected to a local wireless local area network (WLAN), and/or a smartphone connected to the WLAN. Although examples disclosed herein are described in connection with the work environment 118, disclosed examples may be similarly used to monitor non-metered online activities in any other monitored environment.

In the illustrated example of FIG. 1, the AME 108 is provided with a metered/active collection database 122 and a non-metered/passive collection database 124. In some examples, the non-metered/passive collection database 124 may be implemented using the Nielsen SiteCensus database and service provided by The Nielsen Company. The metered/active collection database 122 of the illustrated example collects metered online activity logs 126 from the meter 112 and from similar or identical meters installed at other panelist households. In the illustrated example, metered online activity logs 126 collected by the metered/active collection database 122 include the panelist ID 114 and the online activity 116. In the illustrated example, the metered/active collection database 122 includes a data structure 128 to store site ID's 130 from the online activity 116, and panelist IDs 132 (e.g., the panelist ID 114). In the illustrated example, the site ID's 130 are URL's of websites visited using the panelist computer 106 and/or URL's of media served to the panelist computer 106. The site ID's 130 are collected using any suitable technique such as by intercepting, at the meter 112, website/media information delivered to the panelist computer 106, and extracting the site ID's 130 from the website/media information. Computer metering techniques to collect such information are disclosed in U.S. Pat. No. 5,675,510, to Coffey et al., which is hereby incorporated by reference herein in its entirety.

In the illustrated example, the non-metered/passive collection database 124 receives online activity information from the non-metered secondary devices 104*a-c* using beacon requests. An example beacon request 134 is shown in FIG. 1 that includes a site ID field 136, a cookie field 138, a timestamp field 140, and a source IP address field 142. In the illustrated example, the non-metered secondary devices 104*a-c* generate and send beacon requests 134 to the AME 108 in response to executing software or scripts embedded in web pages or in media presented on web pages served to the non-metered secondary devices 104*a-c*. In examples disclosed herein, using beacon requests 134 to collect online activity information stored in the non-metered/passive collection database 124 is referred to as a non-metered or passive collection technique, because the AME 108 does not have to meter to analyze the Internet traffic at the non-metered secondary devices 104*a-c*. Instead, the AME 108 passively waits until tagged websites cause browsers (e.g., user agents) at the non-metered secondary devices 104*a-c* to send the beacon requests 134 to the AME 108. In examples disclosed herein, using the meter 112 to collect online activity information stored in the metered/active collection database 122 is referred to as a metered or active collection technique, because the meter 112 actively collects Internet traffic at the panelist household 110 to retrieve the online activity information (e.g., the online activity information 116 includes the site IDs 130).

In the illustrated example, web pages are tagged or encoded to include computer executable beacon instructions (e.g., Java, javascript, or any other computer language or script) that are executed by web browsers that access the web pages or media via, for example, the Internet. Such web pages having beacon instructions are called tagged web pages or tagged websites. Irrespective of the type of media being tracked, execution of the beacon instructions causes a web browser to send a request (e.g., referred to herein as a beacon request such as the beacon request 134) to a specified server (e.g., at the AME 108). The beacon request 134 may be implemented as a hypertext transfer protocol (HTTP) request sent to a URL or IP address of a server of the AME 108. However, whereas a traditional HTTP request is used to identify a webpage or other resource that is being requested to be downloaded, the beacon request 134 includes audience measurement information (e.g., a URL in the site ID field 136, a cookie identifier in the cookie field 138, a timestamp in the timestamp field 140, and/or an IP address in the source IP address field 142). The server to which the beacon request 134 is directed is programmed to log the audience measurement data of the beacon request 134 as an impression (e.g., a web page impression) in the non-metered/passive collection database 124. Example techniques that may be used to implement such beacon instructions are disclosed in Blumenau, U.S. Pat. No. 6,108,637, which is hereby incorporated herein by reference in its entirety.

In the illustrated example of FIG. 1, the AME 108 may collect some or all of the information shown in the beacon request 134 using beacon requests from non-metered secondary devices. Formats of some beacon requests may differ from the example format of the beacon request 134, and/or some fields shown in the beacon request 134 may be empty (e.g., when some of the information is unavailable for sending to the AME 108, and/or when beacon instructions cause a web browser to populate less than all of the fields 136, 138, and 140).

In the illustrated example, the source IP address field 142 is located in an IP header 144 of the beacon request 134. In the illustrated example, a router 146 of the work environment 118 serves as a gateway between the non-metered secondary devices 104*a-c* and the Internet. The router 146 stores an IP address 148 that serves as a source IP address shared by the non-metered secondary devices 104a-c to access the Internet. When a beacon request 134 from one of the non-metered secondary devices 104a-c is processed by the router 146 before sending the beacon request 134 to a destination (e.g., to the non-metered/passive collection database 124), the router 146 inserts the IP address 148 into the source IP address field 142 of the IP header 144. In the illustrated example, the AME 108 uses the IP address 148 to determine the source (e.g., the work environment 118) of the beacon request 14.

In the illustrated example, the IP address 148 is a public IP address. A public IP address is an IP address that is used to exchange information (e.g., websites, media, etc.) between devices across the Internet. Public IP addresses differ from private IP addresses in that private IP addresses are only required to be unique within private networks (e.g., a logical network defined by the router 146 in the work environment 118), whereas public IP addresses are unique throughout the Internet. Thus, although a private IP address is unique within one private network, the same private IP address may be used within another, logically separate private network.

In examples disclosed herein, beacon requests 134 report public IP addresses (e.g., the IP address 148 in the source IP address field 142 of the beacon request 134). The uniqueness of public IP addresses throughout the Internet increases opportunities to uniquely associate different public IP addresses with corresponding individual panel members (e.g., the panelist 102) that access the Internet using those public IP addresses. For example, the non-metered secondary devices 104a-c are located at an office of an employer having a single public IP address 148 shared by many employees' computers to access information across the public Internet. If the AME 108 collects online activity logs of URL's visited from the source IP address 148, those URL's may be attributed to any one or more of the non-metered secondary devices 104a-c. Knowing that the panel member 102 is among the multiple employees located at that employer's office, the AME 108 can determine which of the activities in the online activity logs collected from the IP address 148 correspond to activities of the panel member 102 based on similarities or matches between the URL's in non-metered online activity logs (e.g., one or more non-metered online activity logs 154a-c) collected from the IP address 148 of the employer and URL's in the metered online activity logs 126 collected from the meter 112 at the panelist household 110. In the illustrated example, URL's from non-metered online activity logs 154a-c collected from the IP address 148 that do not sufficiently match URL's in the metered online activity logs 126 collected from the meter 112 at the panelist household 110 are deemed to correspond to activities of other employees (e.g., not the panelist 102) in the work environment 118.

In the illustrated example, the AME 108 sets AME cookies 152a-c (e.g., secondary device cookie ID's) in the non-metered secondary devices 104a-c so that beacon requests 134 communicate the AME cookies 152a-c to the non-metered/passive collection database 124 when tagged websites are rendered at the non-metered secondary devices 104a-c. Some or all of the non-metered secondary devices 104a-c may be configured to delete cookies from time to time (e.g., when a user logs off or turns of a computer at the end of a work day or at any other time), causing the AME 108 to set new cookies in the non-metered secondary devices 104a-c whenever previous cookies are deleted. As such, cookies may change frequently for one or more of the non-metered secondary devices 152a-c. As a result of cookie changes, some collected URL's grouped under different cookie identifiers at the AME 108 may actually correspond to a same one of the non-metered secondary devices 104a-c. In the illustrated examples, receipt of a beacon request 134 at the AME 108 is an opportunity for the AME 108 to determine whether an AME cookie is already set at the corresponding non-metered secondary device (e.g., based on whether the cookie field 138 of the received beacon request 134 includes a valid cookie identifier or a null value). If a valid AME cookie is not set, the AME 108 can respond to the beacon request 134 by setting an AME cookie value in the non-metered secondary device. In such a manner, the AME 108 can set the AME cookies 152a-c in corresponding ones of the non-metered secondary devices 104a-c in response to beacon requests 134, when AME cookies are not set therein.

In the illustrated example, the non-metered/passive collection database 124 stores non-metered online activity logs 154a-c of URL's grouped under corresponding ones of the cookie identifiers 152a-c. For example, a log 154a stores URL's including "SITE 1," "SITE 4," and "SITE 5" reported by beacon requests 134 in association with the cookie identifier 152a; a log 154b stores URL's including "SITE 6," "SITE 7," and "SITE 8" reported by beacon requests 134 in association with the cookie identifier 152b, and a log 154c stores URL's including "SITE 5," "SITE 9," and "SITE 10" reported by beacon requests 134 in association with the cookie identifier 152c. The non-metered online activity logs 154a-c of the illustrated example are associated with the same public IP address 148 because the non-metered secondary devices 104a-c are located at the same work environment 118 corresponding to the public IP address 148. In the illustrated example, the non-metered/passive collection database 124 stores the logs 154a-c in association with the IP address 148 of the work environment 118.

In the illustrated example, the non-metered/passive collection database 124 includes a data structure 158 to store site ID's 160, cookies 162, and IP addresses 164 received from non-metered secondary devices (e.g., the non-metered secondary devices 104a-c). The data in the data structure 158 is useful to monitor or track online activities conducted via the non-metered secondary devices. In the illustrated example, the site ID's 160 stored in the non-metered/passive collection database 124 are URL's (e.g., the URL's "SITE 1," "SITE 4," "SITE 5," "SITE 6," "SITE 7," "SITE 8," "SITE 5," "SITE 9," and "SITE 10") used to identify websites visited via the non-metered secondary devices 104a-c.

In the illustrated example, the cookies 162 stored in the non-metered/passive collection database 124 include the cookies 152a-c set by the AME 108 in the non-metered secondary devices 104a-c. In the illustrated example, the IP addresses 164 stored in the non-metered/passive collection database 124 include the IP address 148 of the work environment 118 and/or public IP addresses of other environments and/or devices from which beacon requests are received at the non-metered/passive collection database 124.

To associate non-metered online activity logs (e.g., one or more of the non-metered online activity logs 154a-c corresponding to the non-metered secondary devices 104a-c) with panel members (e.g., the panel member 102), the AME 108 is provided with an example comparative analyzer 168, an example mapper 170, an example panelist database 172, and an example panelist activity map 174. In the illustrated example, the panelist database 172 stores panelist IDs (e.g., the panelist IDs 114 and 132) in association with demographic and/or other information of corresponding panel members (e.g., the panel member 102). In some examples, the demographic and/or other information is collected from panel members during initial enrollment of the panel members in a market research program and/or the collected information can be updated from time to time.

In the illustrated example, the comparative analyzer 168 performs comparative analyses between the site ID's 160 (e.g., including URL's of the non-metered online activity logs 154*a-c*) collected by the non-metered passive collection database 124 and the site ID's 130 (e.g., URL's of the metered online activity logs 126) collected by the metered/active collection database 122. The comparative analyzer 168 of the illustrated example uses comparative analyses to determine which non-metered online activity logs (e.g., the non-metered online activity logs 154*a-c*) are attributable to activities of the panel member 102 in the work environment 118 based on URL's in the non-metered online activity logs 154*a-c* that sufficiently match or are sufficiently similar to a sufficient quantity of URL's (e.g., equal to or greater than a threshold quantity of matches) in the metered online activity logs 126 collected from the panelist household 110. In the illustrated example, comparative analyses may include text-based comparisons of metered URL's to non-metered URL's, cluster analyses, hamming distance analyses, etc.

In the illustrated example, the mapper 170 stores panelist IDs (e.g., the panelist ID's 114 and 132) from the panelist database 172 in association with corresponding cookie identifiers (e.g., one or more corresponding one(s) of the cookie identifiers 152*a-c*) in the panelist activity map 174. In this manner, panelist ID's can be associated with online activities (e.g., the site ID's 160) logged in the non-metered/passive collection database 124 in connection with corresponding cookie identifiers so that the AME 108 can determine which of its panel members visited which URL's from non-metered secondary devices. In addition, the AME 108 can use the mapped information in the panelist activity map 174 to associate online activities (e.g., the site ID's 160) logged in the non-metered/passive collection database 124 that correspond to the panelist 102 with demographic information of the panelist 102 stored in the panelist database 172.

In some examples, other information in addition to IP addresses and cookies may be collected by the AME 108 from non-metered secondary devices (e.g., the non-metered secondary devices 104*a-c*) to assist in identifying online activities of panel members (e.g., the panel member 102) on such non-metered secondary devices. Such other information may include, for example, device types (e.g., desktop computer, tablet device, mobile phone, etc.) of the non-metered secondary devices 104*a-c*. For example, beacon requests (e.g., the beacon request 134) may be adapted to also report device types of the non-metered secondary devices 104*a-c*. In such examples, the non-metered/passive collection database 124 may store device types 178, and the comparative analyzer 168 may also use the device types 178 to perform its comparative analyses. For example, the non-metered/passive collection database 124 of FIGS. 1 and 5 may group URL's based on hierarchical criteria with a highest-level criteria being IP address (e.g., the IP address 148), the next-level criteria being device type (e.g., the device types 178), and the next-level criteria being cookies (e.g., the AME cookies 152*a-c*).

In some examples, the comparative analyzer 168 may additionally parse URL's and search for user-identifying information in the URL's (e.g., the site ID's 160 of FIG. 1) that may assist the comparative analyzer 168 in identifying URL's visited by particular panelists (e.g., the panelist 102). For example, some URL's may include parameters specifying names, usernames, email addresses, or other personal identifying information. For example, a person's name may appear in the URL of their social website page such as the name 'John Doe' in the URL 'www.socialnetwork.com/~johndoe'. In some examples, the comparative analyzer 168 may use such personal identifying parameters form URL's to associate corresponding panelists with one or more cookies (e.g., the AME cookies 152*a-c*) corresponding to those URL's. In this manner, any other online activity (other URL's) grouped under a same cookie are also deemed to correspond with online activity of the same panelist even if those other URL's do not include personal identifying information.

Figure 2:
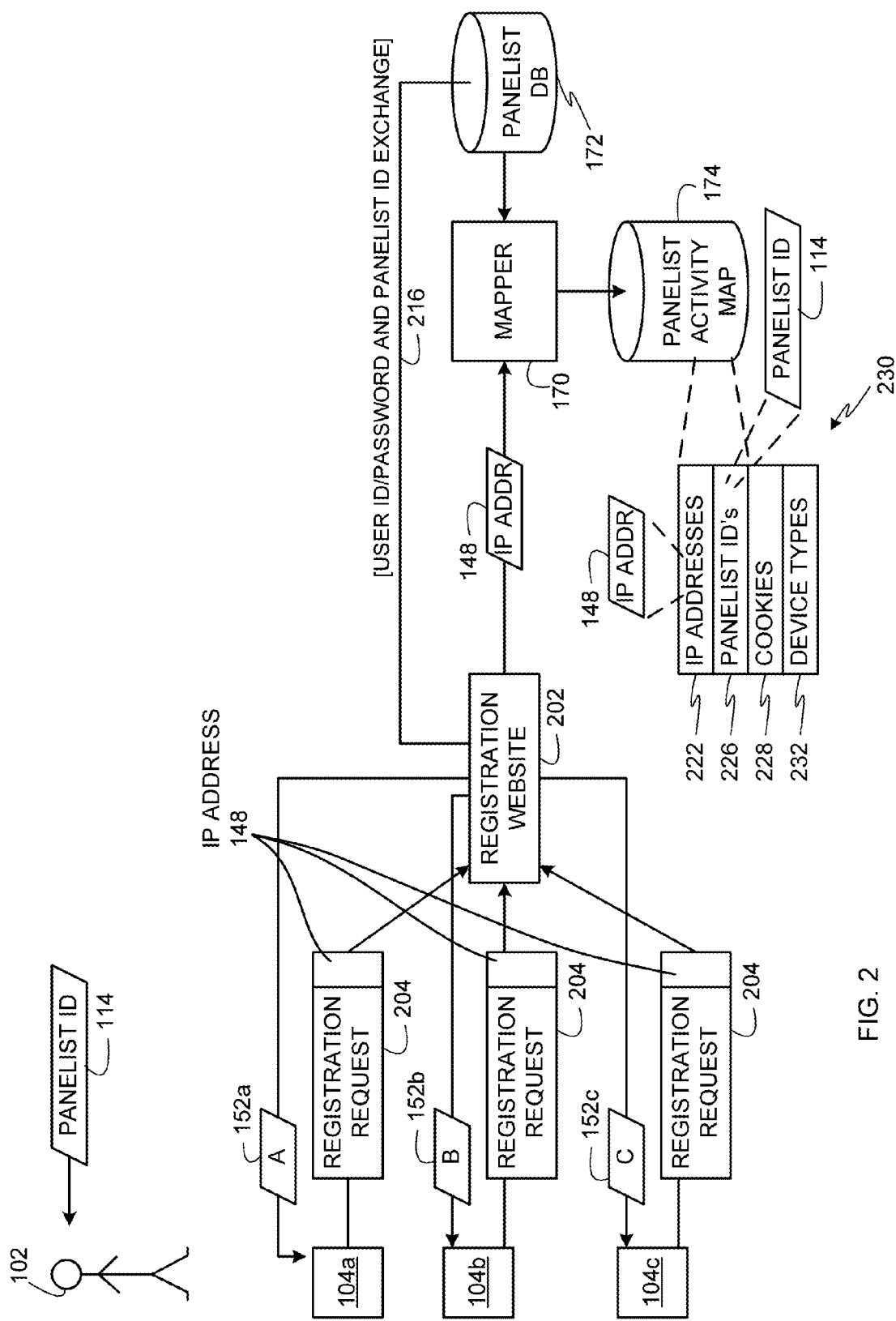
FIG. 2 depicts an example internet protocol (IP) address registration process to associate public IP addresses used by non-metered secondary devices with corresponding panel member identifiers.

FIG. 2 depicts an example IP address registration process to associate the IP address 148 of the work environment 118 of FIG. 1 with the panel member 102. In the illustrated example, to associate the IP address 148 with the panel member 102, the panel member 102 is requested to visit an example registration website 202 via a corresponding one of the non-metered secondary devices 104*a-c*. The registration website 202 of the illustrated example is configured to receive the IP address 148 during the registration process. In this manner, the AME 108 can determine that at least some of the online activity reported from the IP address 148 (e.g., via beacon requests 134 of FIG. 1) corresponds to activities of the panel member 102 when located in the work environment 118. In the illustrated example, it is understood that some online activity reported from the IP address 148 corresponds to other employees or persons located at the work environment 118.

In the illustrated example, the registration website 202 is hosted by the AME 108. However, it may alternatively be hosted by a third-party service in communication with the AME 108. In some examples, the AME 108 can instruct the panel member 102 to register with the registration website 202 via a corresponding one of the non-metered secondary devices 104*a-c* at specified intervals (e.g., daily, weekly, monthly, or any other suitable interval) to increase the likelihood that the AME 108 has the most recent public IP address 148 corresponding to the work environment 118 should the public IP address 148 change from time to time. Such instructions to the panel member 102 may be in the form of emails, instant messages, calendar reminders, etc. that include a hyperlink of a URL of the registration website 202. For instances in which the public IP address 148 is static, the AME 108 may ask that the panel member 102 register with the registration website 202 only once, or relatively less frequently than if the public IP address 148 were a dynamic IP address. In some examples, the AME 108 may offer rewards (e.g., reward points, monetary rewards, products, services, etc.) to the panel member 102 as an incentive to register one or more times with the registration website 202.

In the illustrated example, to begin a registration process from a corresponding one of the non-metered secondary devices 104*a-c*, the panel member 102 selects a hyperlink to send a registration request 204 (e.g., an HTTP request) to the registration website 202 from one or more of the non-metered secondary devices 104*a-c*. Alternatively, the panel member 102 enters a URL of the registration website 202 into a web browser. In the illustrated examples disclosed herein, to register a particular non-metered secondary device 104*a-c*, the AME 108 instructs the panel member 102 to visit the registration website 202 from a web browser of a corresponding one(s) of the non-metered secondary device 104a-c connected to a network of the work environment 118. In this manner, the public IP address reported to the registration website 202 during the registration process will be the IP address 148 of the work environment 118.

Figure 3:
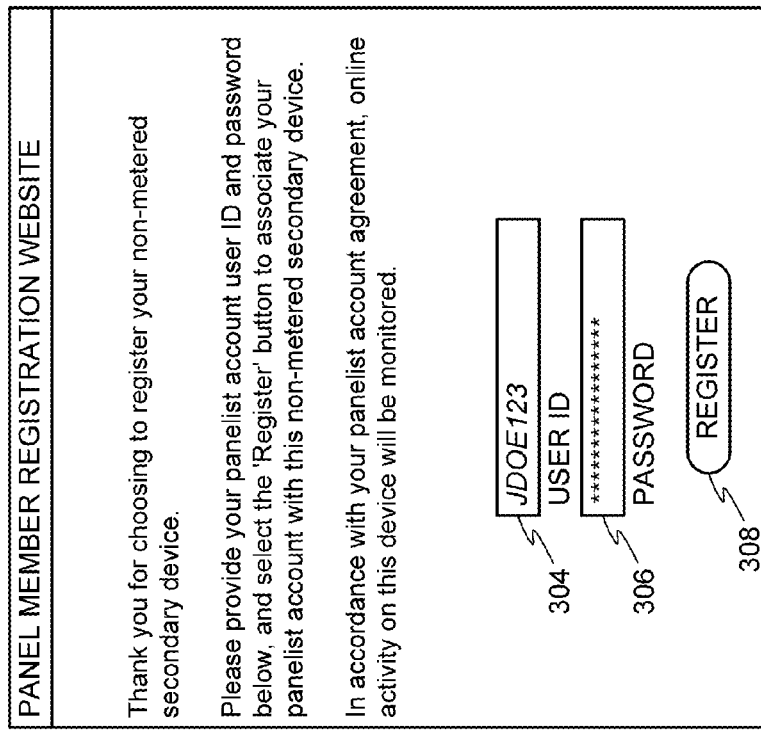
FIG. 3 depicts an example registration instruction web page useable to register panel members at non-metered secondary devices, and to collect public IP addresses used by the non-metered secondary devices.

After, the registration website 202 receives the registration request 204, the registration website 202 serves a registration instruction web page to the one or more non-metered secondary devices 104a-c. An example registration instruction web page 302 is shown in FIG. 3. In the illustrated example of FIG. 3, the registration instruction web page 302 informs the panel member 102 that she/he is about to register the non-metered secondary device 104a-c of the panel member 102, and instructs the panel member 102 to provide a panelist account user ID 304 and password 306. When the panel member 102 selects a register button 308, the registration website 202 of FIG. 2 associates the IP address 148 of the work environment 118 with the panelist ID (e.g., the panelist ID 114) of the panel member 102. In the illustrated example, the registration website 202 receives the IP address 148 in an IP header (e.g., similar to the IP header 144 of FIG. 1) of the registration request 204 sent by the non-metered secondary device 104a-c to the registration website 202.

In the illustrated example, the registration website 202 uses the panelist user ID 304 and password 306 of FIG. 3 to retrieve the panelist ID 114 from the panelist database 172 using a user ID/password and panelist ID exchange 216. In some examples, when the panel member 102 selects the registration button 308 of FIG. 3, the registration website 202 sets a corresponding one of the AME cookies 152a-c and sends the AME cookie 152a-c to a registering one of the non-metered secondary devices 104a-c for storing therein. In the illustrated example, the registration website 202 sets the AME cookies 152a-c during the registration process to create an initial cookie-to-panelist mapping in the panelist activity map 174. As discussed above, some non-metered secondary devices delete cookies frequently. As such, the AME cookies 152a-c may change frequently. For example, with each beacon request (e.g., the beacon request 134 of FIG. 1) received from the non-metered secondary devices 104a-c, the AME 108 can re-set new cookie identifiers whenever the non-metered secondary devices 104a-c do not have an AME cookie (e.g., a previous AME cookie was deleted or an AME cookie was not previously set). In this manner, at least some online activity can be reported to the AME 108 using the same AME cookie identifiers before they are deleted and re-set in the in the non-metered secondary devices 104a-c.

In the illustrated example, the initial cookie-to-panelist mapping created in the panelist activity map 174 during registration with the registration website 202 is used to build an initial online activity history for the panelist 102 until the cookie is deleted. Because the cookie set during registration with the registration website 202 is known to correspond with the panelist 102, any online activity reported with this cookie in beacon requests 134 (FIG. 1) from the work environment 118 (FIG. 1) is also known to correspond to the panelist 102. If the cookie lasts for an extended duration (e.g., for a day or longer, or any duration sufficient to establish a suitable web browsing history), sufficient URL's may be collected in the initial online activity history to establish a base or initial understanding of web browsing behaviors and habits (e.g., listings of URL's, times/days of URL visits, etc.) of the panelist 102 while at the work environment 118. The comparative analyzer 168 may then use such base or initial understanding of web browsing behaviors and habits of the panelist 102 at the work environment 118 in addition to or instead of web browsing behaviors and habits (e.g., listings of URL's, times/days of URL visits, etc.) observed from the online activity 116 collected by the meter 112 at the panelist household 110 when analyzing non-metered online activity (e.g., the non-metered online activity logs 154a-c of FIG. 1) to determine which online activity reported from the work environment 110 corresponds to the panelist 102.

Once the cookie set during registration is deleted from the non-metered secondary device (e.g., one of the non-metered secondary devices 104a-c) and/or replaced by another AME cookie, a known cookie-to-panelist association is lost. Thus, although beacon request 134 continue to report online activity of the panel member 102 from the work environment 118, such beacon requests 134 will include a different cookie that is unknown to the AME 108 as corresponding with the panelist 102. However, examples disclosed herein can be used to perform comparative analyses between metered online activity (e.g., the online activity 116 of FIG. 1) and non-metered online activity (e.g., the non-metered online activity logs 154a-c of FIG. 1) to determine which cookies correspond to the panelist 102 after the cookie set during registration is deleted and/or replaced in a corresponding non-metered secondary device used by the panelist 102.

In the illustrated example, the registration website 202 sends the IP address 148 to the mapper 170. The mapper 170 of the illustrated example associates the IP address 148 with the panelist ID 114 of the panel member 102 in the panelist activity map 174. In the illustrated example, the panelist activity map 174 stores IP addresses 222 (e.g., including the IP address 148) in association with corresponding panelist ID's 226 (e.g., including the panelist ID 114) and corresponding cookie identifiers 228 (e.g., one or more of the cookies 152a-c) in a data structure 230 to monitor online activities of panel members that use non-metered secondary devices in different environments in which meters (e.g., the meter 112 of FIG. 1) cannot be installed and/or that use non-metered secondary devices on which the AME 108 has decided not to install meters. In some examples, associating IP addresses 222 with corresponding panelist ID's 226 is useful in connection with examples disclosed herein to reduce the need to install meters on every device that the AME 108 desires to monitor. In this manner, the AME 108 may monitor online activities of panelists on different devices by associating IP addresses 222 with corresponding panelist ID's 226 in the panelist activity map 174 without incurring additional costs and complexities associated with installing meters on all of the monitored devices used by the panelists. In some examples, the registration website 202 may also receive device types 232 (e.g., similar to the device types 178 of FIG. 1) of registering ones of the non-metered secondary devices 104a-c, and the panelist activity map 174 may store the device types 232 in association with corresponding IP addresses 222, panelist ID's 226, and cookies 228. In the illustrated example, the device types 232 specify the type of device of the non-metered secondary devices 104a-c such as desktop computer, tablet device, mobile phone, etc.

Figure 4:
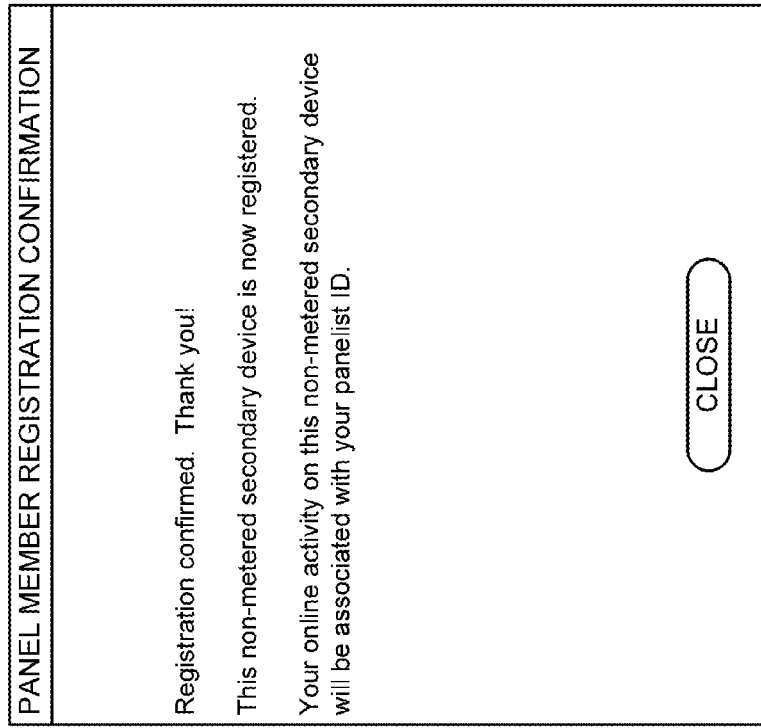
FIG. 4 depicts an example registration confirmation website confirming that a public IP address used by a non-metered secondary device has been registered.

After storing the IP address 148 in association with the panelist ID 114 in the panelist activity map 174, the registration website 202 of the illustrated example serves an example registration confirmation web page 402 to the non-metered secondary device 104a-c as shown in FIG. 4. The example confirmation web page 402 informs the panel member 102 that registration is complete and that online activities of the panel member 102 will be monitored on the non-metered secondary device 104*a*-*c* registered with the registration website 202.

Figure 5:
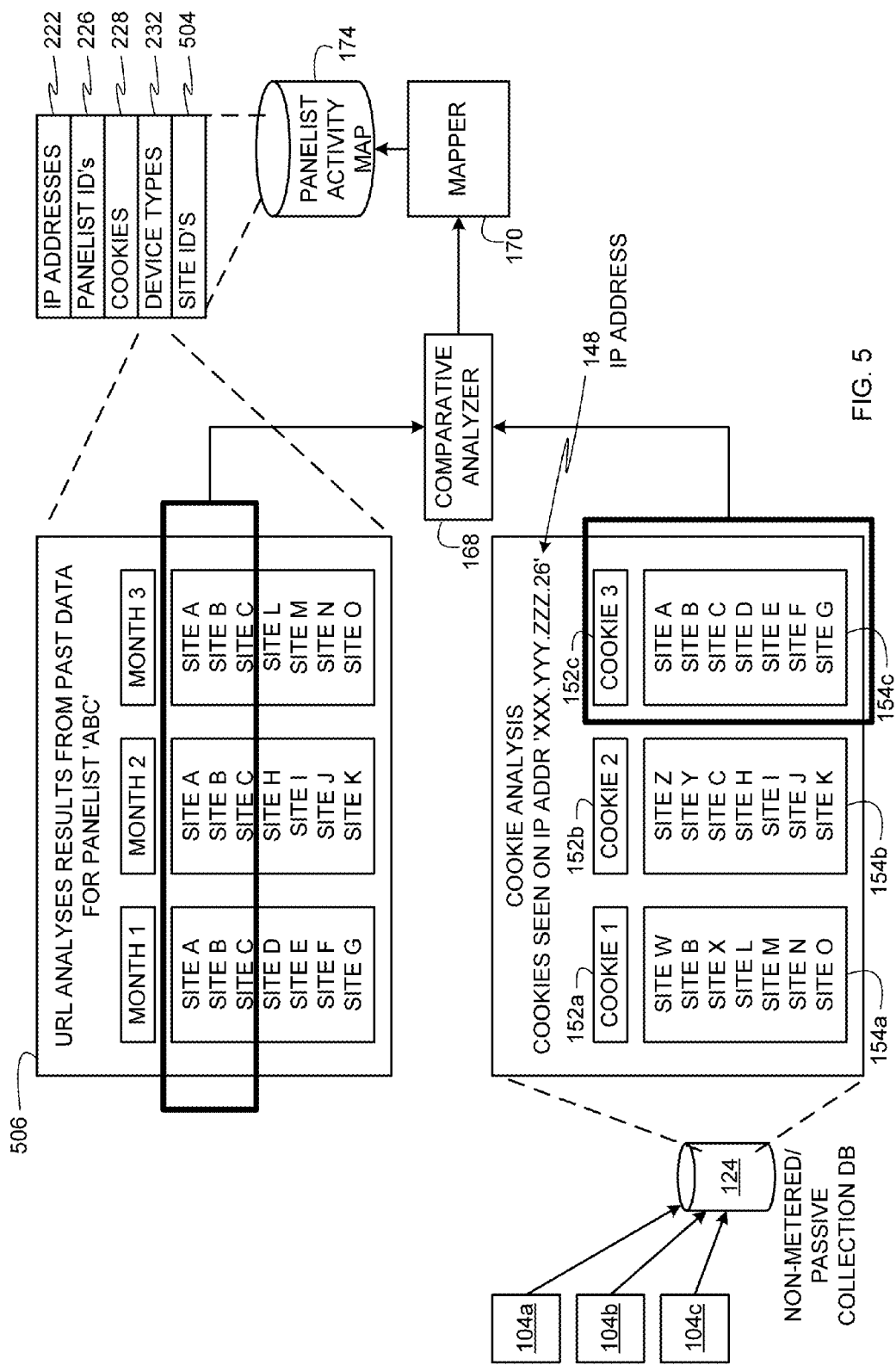
FIG. 5 illustrates an example manner of determining non-metered online activities attributable to panel members based on comparative analyses of uniform resource locators (URL's) known to have been historically frequented by the panel members and URL's collected from non-metered secondary devices.

FIG. 5 illustrates an example manner of determining non-metered online activities attributable to the panel member 102 based on performing comparative analyses of URL's known to have been historically frequented by the panel member 102 and URL's collected from non-metered secondary devices (e.g., the non-metered secondary devices 104*a*-*c*). In the illustrated example, the panelist activity map 174 stores corresponding IP addresses 222, panelist ID's 226, cookie identifiers 228, device types 232, and site ID's 504. In the illustrated example, ones of the cookie identifiers 228 and the site ID's 504 correspond to online activities identified as corresponding to the panel member 102 (FIGS. 1 and 2). In the illustrated example, a URL analyses results data structure 506 shows URL's visited by the panel member 102 over a three-month time frame. The URL analyses results data structure 506 of the illustrated example is stored in the panelist activity map 174. In the illustrated example, the URL analyses results data structure 506 initially includes URL's (e.g., the site ID's 130 of FIG. 1) reported by the meter 112 at the panelist household 110 of FIG. 1. Over time as the comparative analyzer 168 identifies URL's (e.g., corresponding ones of the site ID's 160 of FIG. 1) visited by the panel member 102 via one or more non-metered secondary devices (e.g., one or more of the non-metered secondary devices 104*a*-*c* of FIGS. 1 and 2), the URL analyses results data structure 506 also stores those URL's visited by the panel member 102 from the one or more non-metered secondary devices. In this manner, the URL analyses results data structure 506 builds a larger collection over time of online activity habits and behaviors of the panel member 102.

In the illustrated example, the non-metered/passive collection database 124 is shown storing the non-metered online activity logs 154*a*-*c* of URL's grouped under corresponding ones of the cookie identifiers 152*a*-*c*. In the illustrated example, the non-metered online activity logs 154*a*-*c* and corresponding cookie identifiers 152*a*-*c* are grouped together as being received from the same IP address 148 (e.g., IP address 'XXX.YYY.ZZZ.26') corresponding to the work environment 118 of FIG. 1. As such, knowing that the panel member 102 is associated with the IP address 148 based on the IP address registration process of FIG. 2, it is confirmed that at least some of the non-metered online activity logs 154*a*-*c* correspond to online activities of the panel member 102 when located in the work environment 118. In the illustrated example, the comparative analyzer 168 performs comparative analyses between URL's in the URL analyses results data structure 506 and URL's in the non-metered online activity logs 154*a*-*c* to determine which of the website visits identified in the non-metered online activity logs 154*a*-*c* is/are attributable to online activities of the panel member 102. In the illustrated example, the comparative analyzer 168 may perform any suitable type of comparative analysis. For example, the comparative analyzer 168 may perform text-based comparisons between URL's in the URL analyses results data structure 506 and URL's in the non-metered online activity logs 154*a*-*c*. Additionally or alternatively, the comparative analyzer 168 may perform one or more types of cluster analyses between groups of URL's in the URL analyses results data structure 506 and the URL's in the non-metered online activity logs 154*a*-*c*. Additionally or alternatively, the comparative analyzer 168 may determine hamming distances between URL's in the URL analyses results data structure 506 and URL's in the non-metered online activity logs 154*a*-*c* to identify URL's that are sufficiently close matches.

In the illustrated example, the comparative analyzer 168 determines which of the non-metered online activity logs 154*a*-*c* are attributable to the panel member 102 based on which of the non-metered online activity logs 154*a*-*c* include at least a threshold quantity of URL's that sufficiently match (e.g., are sufficiently similar to) URL's in the URL analyses results data structure 506. In some examples, the threshold quantity of URL's may be based on a count threshold or a percentage threshold. For example, a count threshold may be used to specify that at least four (or any other number) URL's must sufficiently match between the URL analyses results data structure 506 and one of the non-metered online activity logs 154*a*-*c*. A percentage threshold may be used to specify that at least, for example, thirty percent (30%) (or any other percentage) of the URL's in one of the non-metered online activity logs 154*a*-*c* must match URL's in the URL analyses results data structure 506.

In the illustrated example, the sufficiency of matches between URL's in the URL analyses results data structure 506 and URL's in the non-metered online activity logs 154*a*-*c* is based on the type of comparative analysis performed. In some examples, URL's must be similar to one another within a similarity threshold (e.g., a threshold specifying maximum non-matching characters, digits, words, etc.). For example, a similarity threshold for a text-based comparison may require that at least domain name portions must match between two URL's. For example, the comparative analyzer 168 may determine that a sufficient match exists between the URL 'www.nielsen.com/ProductPages' and the URL 'www.nielsen.com/ClientLogin' because at least the domain name portion 'www.nielsen.com' matches between the two URL's. For sufficiency of matches using hamming distances, the comparative analyzer 168 may determine that a sufficient match exists between the URL 'www.nielsen.com' and the URL 'www1.nielsen.com' because the hamming distance is less than a similarity threshold hamming distance. For example, the similarity threshold hamming distance may be three, and the hamming distance between the URL 'www.nielsen.com' and the URL 'www1.nielsen.com' is one because of the one character difference between 'www' and 'www1.'

In some examples, the comparative analyzer 168 may use text-based comparisons, hamming distance techniques, and/or any other comparative techniques in connection with cluster analyses techniques to determine URL's that are more similar to one another between one of the non-metered online activity logs 154*a*-*c* and the URL analyses results data structure 506 than between others of the non-metered online activity logs 154*a*-*c* and the URL analyses results data structure 506. In some examples, cluster analyses may be performed using times/days of URL accesses as criteria in a cluster analyses model. For example, the panel member 102 may access certain websites at particular times of day, which may establish a known behavior by which online activities of the panel member 102 may be detected in non-metered online activity (e.g., the non-metered online activity logs 154*a*-*c*). In such examples, timestamps in the timestamp field 140 (FIG. 1) may be used to track times/days of reported URL accesses. For example, timestamps may be stored in the non-metered/passive collection database 124 in association with corresponding site ID's 160, cookies 162, and IP addresses 164.

In the illustrated example of FIG. 1, the comparative analyzer 168 determines that the non-metered online activity log 154*c* is attributable to online activity of the panel member 102 because a threshold quantity of URL's in the non-metered online activity log 154c sufficiently match URL's in the URL analyses results data structure 506. In the illustrated example, the threshold quantity of sufficiently matching URL's include "SITE A," "SITE B," and "SITE C." In the illustrated example, the comparative analyzer 168 causes the mapper 170 to store the cookie identifier 152c and corresponding URL's (e.g., site IDs) of the non-metered online activity log 154c in association with the panelist ID 114 (FIGS. 1 and 2) of the panel member 102 in the panelist activity map 174. Alternatively, the mapper 170 may store the cookie identifier 152c in association with the panelist ID 114 in the panelist activity map 174 without storing the corresponding URL's of the non-metered online activity log 154c. In this manner, less storage capacity is used in the panelist activity map 174, and URL's for corresponding cookie ID's can be retrieved from the non-metered/passive collection database 124 based on the cookies 228 stored in the panelist activity map 174.

While an example manner of implementing the comparative analyzer 168 and the mapper 170 has been illustrated in FIGS. 1, 2, and 5, one or more elements, processes and/or devices used to implement the comparative analyzer 168 and/or the mapper 170 may be combined, divided, rearranged, omitted, eliminated and/or implemented in any other way. Further, the example comparative analyzer 168 and/or the example mapper 170 may be implemented by hardware, software, firmware and/or any combination of hardware, software and/or firmware. Thus, for example, the example comparative analyzer 168 and/or the mapper 170 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example comparative analyzer 168 and/or the example mapper 170 are hereby expressly defined to include a tangible computer readable storage medium such as a memory, a DVD, a CD, a Blu-ray disc, etc. storing the software and/or firmware. Further still, the example analyzer 168 and/or the example mapper 170 may include one or more elements, processes and/or devices in addition to, or instead of, those described in connection with FIGS. 1, 2, and 5, and/or may include more than one of any or all of the described elements, processes and devices.

Figure 6:
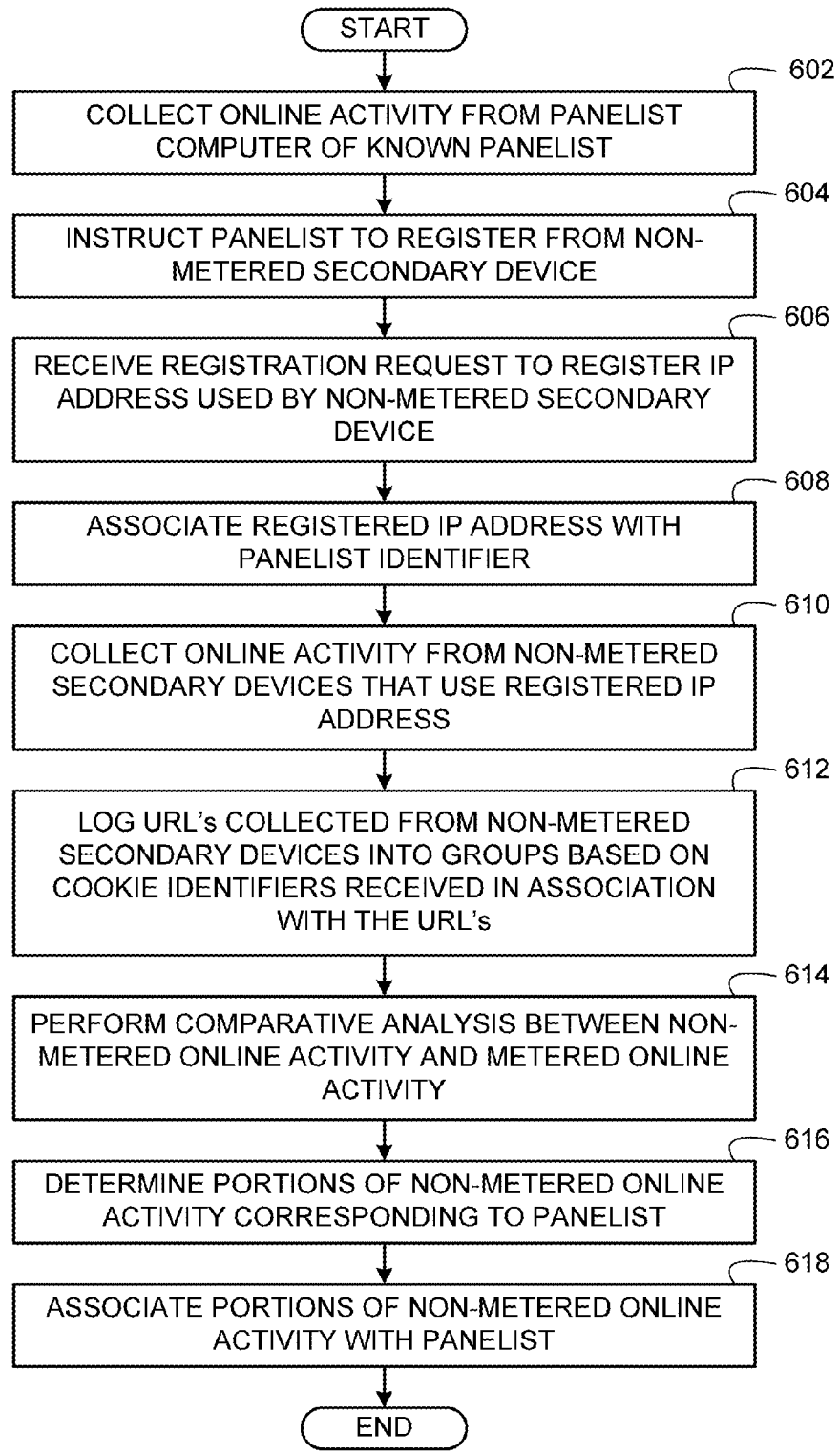
FIG. 6 is a flowchart which is representative of example machine readable instructions that may be executed to monitor online activities of panel members at non-metered secondary devices.
Figure 7:
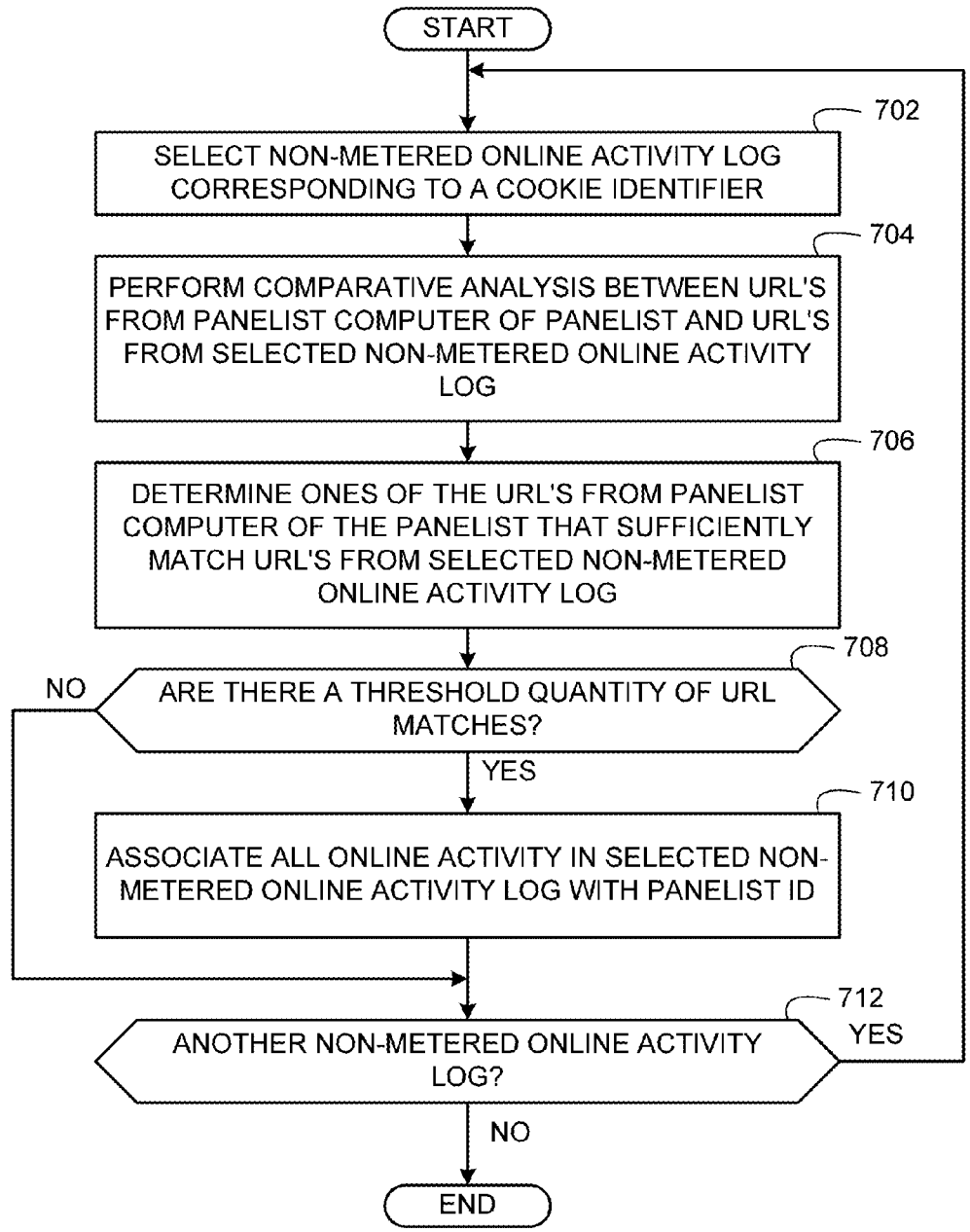
FIG. 7 is a flowchart which is representative of example machine readable instructions that may be executed to perform comparative analyses between metered online activities of a panelist and non-metered online activities to identify portions of the non-metered online activities corresponding to the panelist.

Flowcharts representative of example machine readable instructions to implement the comparative analyzer 168 and/or the mapper 170 of FIGS. 1, 2, and 5 are shown in FIGS. 6 and 7. In this example, the machine readable instructions comprise programs for execution by a processor such as the processor 812 shown in the example computer 800 discussed below in connection with FIG. 8. The program may be embodied in software stored on a tangible computer readable storage medium such as a CD-ROM, a floppy disk, a hard drive, a digital versatile disk (DVD), a Blu-ray disc, or a memory associated with the processor 812, but the entire program and/or parts thereof could alternatively be executed by a device other than the processor 812 and/or embodied in firmware or dedicated hardware. Further, although the example programs are described with reference to the flowcharts illustrated in FIGS. 6 and 7, many other methods of implementing the example comparative analyzer 168 and/or the example mapper 170 may alternatively be used. For example, the order of execution of the blocks may be changed, and/or some of the blocks described may be changed, eliminated, or combined.

As mentioned above, the example processes of FIGS. 6 and 7 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk and to exclude propagating signals. Additionally or alternatively, the example processes of FIGS. 6 and 7 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Turning to the example process of FIG. 6, initially the metered/active collection database 122 (FIG. 1) collects online activity (e.g., the metered online activity logs 126 of FIG. 1) from the panelist computer 106 (FIG. 1) of the known panelist 102 (block 602). For example, the metered/active collection database 122 receives the metered online activity logs 126 from the meter 112 of FIG. 1. The AME 108 (FIG. 1) instructs the panelist 102 to register from a corresponding non-metered secondary device (e.g., one of the non-metered secondary devices 104a-c of FIGS. 1, 2, and 5) (block 604). For example, a server or other computer of the AME 108 may send an email, a text message, or any other suitable notification or message to the panelist 102 instructing the panelist 102 to register an IP address used by a non-metered secondary device used by the panelist 102.

The AME 108 receives a registration request 204 (FIG. 2) to register an IP address 148 used by a non-metered secondary device 104a-c of the panelist 102 (block 606). For example, the AME 108 receives a registration request 204 at the registration website 202 (FIG. 2) in response to the panelist 102 navigating to a URL of the registration website 202 (e.g., entering the URL in a web browser or selecting a registration link) from a corresponding one of the non-metered secondary devices 104a-c. The mapper 170 (FIGS. 1 and 2) associates the registered IP address 148 with the panelist ID 114 (FIGS. 1 and 2) of the panelist 102 (block 608). For example, the mapper 170 stores the IP address 148 in association with the panelist ID 114 in the example panelist activity map 174 (FIGS. 1 and 2).

The non-metered/passive collection database 124 (FIGS. 1, 2, and 5) collects online activities from the non-metered secondary devices 104a-c that share the registered IP address 148 (block 610). For example, the non-metered/passive collection database 124 collects URL's via beacon requests 134 (FIG. 1) received from the non-metered secondary devices 104a-c. The non-metered/passive collection database 124 logs URL's (e.g., the site ID's 160 of FIG. 1) collected from the non-metered secondary devices 104a-c into groups based on cookie identifiers (e.g., the cookie identifiers 152a-c of FIG. 1) received in association with the URL's (block 612). For example, the non-metered/passive collection database 124 groups the URL's into the non-metered online activity logs 154a-c for corresponding ones of the cookies 152a-c as shown in FIGS. 1 and 5.

The comparative analyzer 168 performs a comparative analysis between non-metered online activity and metered online activity (block 614). For example, the comparative analyzer 168 compares URL's in the non-metered online activity logs 154a-c (FIGS. 1 and 5) with URL's in the URL analyses results data structure 506 (FIG. 5) and/or URL's in the metered online activity logs 126 (FIG. 1). The comparative analyzer 168 determines portions of the non-metered online activity that correspond to online activity of the panelist 102 (block 616). For example, the comparative analyzer 168 may determine, based on the comparative analysis of block 614, that the non-metered online activity log 154c corresponds to the panelist 102 (as shown in FIG. 5) when using a non-metered secondary device 104a-c in the work environment 118 of FIG. 1. The mapper 170 associates the portions of the non-metered online activity identified at block 616 with the panelist 102 (block 618). For example, the mapper 170 may store the non-metered online activity log 154c and the AME cookie 152c (FIG. 5) in the panelist activity map 174 (FIGS. 1 and 5) in association with the panelist ID 114 of the panelist 102. Alternatively, the mapper 170 may store the AME cookie 152c in the panelist activity map 174 in association with the panelist ID 114 without storing the corresponding non-metered online activity log 154c in the panelist activity map 174. In this manner, less storage capacity is used in the panelist activity map 174 to associate the panelist 102 with non-metered online activity, and the AME cookie 152c stored in the panelist activity map 174 can be used to look up the corresponding non-metered online activity log 154c in the non-metered/passive collection database 124 of FIGS. 1 and 5. The example process of FIG. 6 then ends.

FIG. 7 is representative of example machine readable instructions that may be executed to perform comparative analyses between metered online activities (e.g., the URL analyses results data structure 506 of FIG. 5 and/or the metered online activity logs 126 of FIG. 1) of a panelist (e.g., the panelist 102) and non-metered online activities (e.g., the non-metered online activity logs 154a-c of FIGS. 1 and 5) to identify portions of the non-metered online activities corresponding to the panelist. In some examples, the example process of FIG. 7 may be used to implement the operations of blocks 614, 616, and 618 of FIG. 6.

Initially, the comparative analyzer 168 (FIGS. 1 and 5) selects a non-metered online activity log corresponding to a cookie identifier (block 702). For example, the comparative analyzer 168 may select one of the non-metered online activity logs 154a-c associated with a corresponding one of the cookie identifiers 152a-c of FIGS. 1 and 5. The comparative analyzer 168 performs a comparative analysis between URL's (e.g., ones of the site ID's 130 of FIG. 1) collected from the panelist computer 106 (FIG. 1) of the panelist 102 and URL's (e.g., ones of the site ID's 160 of FIG. 1) from the selected non-metered online activity log (block 704). The comparative analysis used by the comparative analyzer 168 at block 704 may be any comparative analysis described herein and/or any other suitable comparative analysis technique(s).

The comparative analyzer 168 determine ones of the URL's (e.g., ones of the site ID's 130) collected from the panelist computer 106 of the panelist 102 that sufficiently match URL's (e.g., ones of the site ID's 160 of FIG. 1) from the selected non-metered online activity log (block 706). The sufficiency of matches may be determined based on any similarity threshold-based technique described herein and/or any other suitable technique(s) for assessing a sufficient similarity between two objects to confirm that a sufficient match exists.

The comparative analyzer 168 determines whether there are a threshold quantity of URL matches (block 708) between the URL's (e.g., ones of the site ID's 130) collected from the panelist computer 106 and the URL's (e.g., ones of the site ID's 160 of FIG. 1) from the selected non-metered online activity log. If the quantity of URL matches is equal to or greater than a threshold (block 708), the mapper 170 associates all online activity in selected non-metered online activity log with the panelist ID 114 of the panelist 102 (block 710). For example, the mapper 170 may store the non-metered online activity log 154c and the AME cookie 152c (FIG. 5) in the panelist activity map 174 (FIGS. 1 and 5) in association with the panelist ID 114 of the panelist 102. Alternatively, the mapper 170 may store the AME cookie 152c in the panelist activity map 174 in association with the panelist ID 114 without storing the corresponding non-metered online activity log 154c in the panelist activity map 174. In this manner, less storage capacity is used in the panelist activity map 174 to associate the panelist 102 with non-metered online activity, and the AME cookie 152c stored in the panelist activity map 174 can be used to look up the non-metered online activity log 154c in the non-metered/passive collection database 124 of FIGS. 1 and 5. In some examples, the AME 108 can use the mapped information in the panelist activity map 174 to associate online activities (e.g., the site ID's 160) logged in the non-metered/passive collection database 124 that correspond to the panelist 102 with demographic information of the panelist 102 stored in the panelist database 172.

After the operation of block 710, or if the quantity of URL matches is not equal to or greater than a threshold at block 708, the comparative analyzer 168 determines whether there is another non-metered online activity log (e.g., another one of the non-metered online activity logs 154a-c) to analyze (block 712). If there is another non-metered online activity log to analyze (block 712), control returns to block 712. Otherwise, the example process of FIG. 7 ends.

Figure 8:
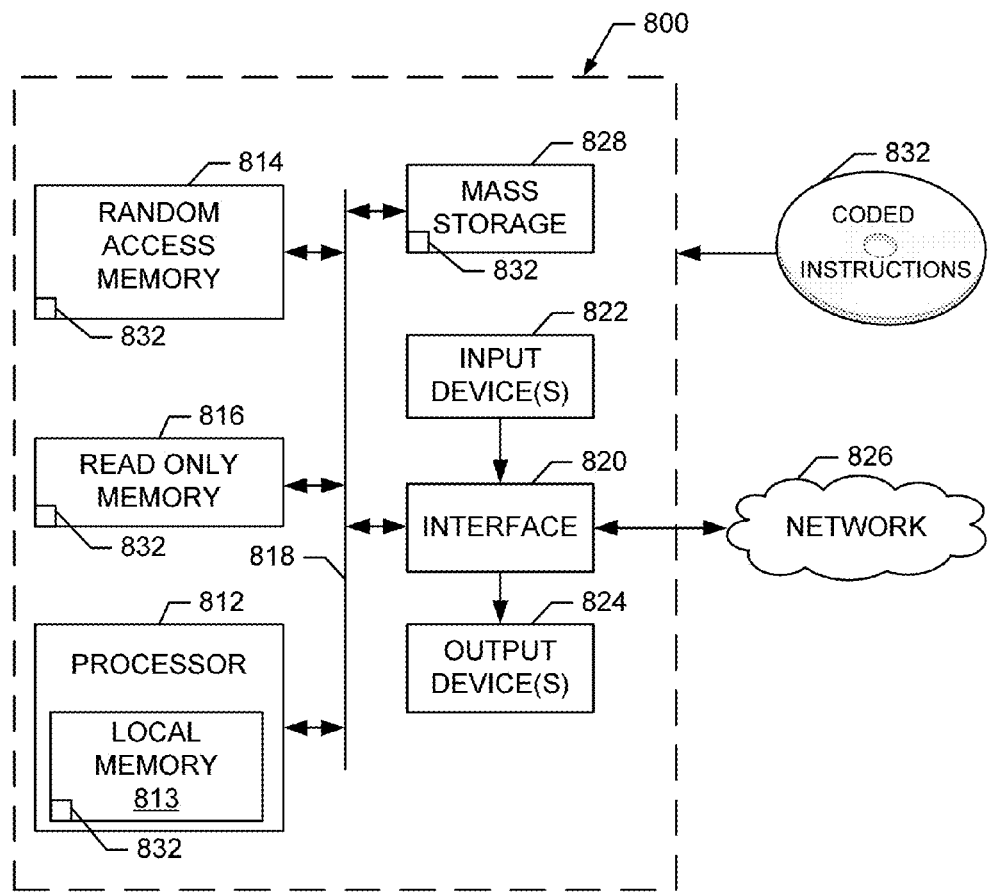
FIG. 8 is an example processor system that may be used to execute the example instructions of FIGS. 6 and/or 7 to implement example apparatus and systems disclosed herein.

FIG. 8 is a block diagram of an example processor platform 800 capable of executing the instructions of FIGS. 6 and 7 to implement the comparative analyzer 168 and/or the mapper 170 of FIGS. 1, 2, and 5. The processor platform 800 can be, for example, a server, a personal computer, and/or any other suitable type of computing device.

The processor platform 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives. The mass storage device 828 may implement one or more of the metered/active collection database 122, the non-metered/passive collection database 124, the panelist database 172, and/or the panelist activity map 174 of FIGS. 1, 2, and 5.

Coded instructions 832 to implement the example processes of FIGS. 6 and 7 may be stored in the mass storage device 828, in the volatile memory 814, in the non-volatile memory 816, and/or on a removable storage medium such as a CD or DVD.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. Accordingly, while the above describes example methods, apparatus, systems, and articles of manufacture, the examples provided are not the only ways to implement such methods, apparatus, systems, and articles of manufacture. Thus, while certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to monitor online activity, the method comprising:
    storing, at a first server, first uniform resource locators received at the first server via first network communications from a first client device, the first client device having a meter;
    storing, at the first server or a second server, second uniform resource locators received at the first server or the second server via second network communications from a second client device, the second client device not having a meter;
    determining, with a processor, that ones of the second uniform resource locators from the second client device correspond to online activity of a user associated with the first client device based on ones of the first uniform resource locators matching at least portions of the ones of the second uniform resource locators; and
    in response to determining ones of the second uniform resource locators from the second client device correspond to the online activity of the user associated with the first client device, associating, with the processor, the second client device with the user of the first client device, the associating including setting a cookie associated with the user on the second client device;
    after setting the cookie on the second client device, storing third uniform resource locators from the second client device in association with the online activity of the user associated with the first client device; and
    after deletion of the cookie from the second client device, applying the third uniform resource locators stored in association with the online activity of the user to third network communications to identify subsequent online activity of the user reported by the second client device via the third network communications.

2. The method as defined in claim 1, wherein the determining that the ones of the second uniform resource locators correspond to the online activity includes determining that at least first domain name portions of the first uniform resource locators match second domain name portions of the ones of the second uniform resource locators.

3. The method as defined in claim 1, wherein the determining that the ones of the second uniform resource locators correspond to the online activity includes comparing differences between the at least portions of the ones of the second uniform resource locators and corresponding portions of the first uniform resource locators to a similarity threshold.

4. The method as defined in claim 1, wherein the second uniform resource locators are collected from the second client device is in response to the user of the first client device registering an internet protocol address associated with the second client device.

5. The method as defined in claim 1, wherein the subsequent online activity of the user via the second client device is identified when portions of the third uniform resource locators match portions of fourth uniform resource locators collected from the second client device after the cookie is deleted.

6. An apparatus to monitor online activity, the apparatus comprising:
    a first data structure to store, at a first server, first uniform resource locators received at the first server via first network communications from a first client device, the first client device having a meter;
    a second data structure to store, at the first server or a second server, second uniform resource locators received at the first server or the second server via second network communications from a second client device, the second client device not having a meter; and
    a processor programmed to:
        determine that ones of the second uniform resource locators from the second client device correspond to online activity of a user associated with the first client device based on ones of the first uniform resource locators matching at least portions of the ones of the second uniform resource locators; and
        in response to determining ones of the second uniform resource locators from the second client device correspond to the online activity of the user associated with the first client device, associate the second client device with the user of the first client device, the associating including setting a cookie associated with the user on the second client device;

associate third uniform resource locators from the second client device with the online activity of the user associated with the first client device based on the cookie set on the second client device; and use the third uniform resource locators to identify subsequent online activity of the user at the second client device after deletion of the cookie from the second client device.

7. The apparatus as defined in claim 6, wherein the processor is to determine that the ones of the second uniform resource locators correspond to the online activity by determining that at least first domain name portions of the first uniform resource locators match second domain name portions of the ones of the second uniform resource locators.

8. The apparatus as defined in claim 6, further including a mapper to determine that the ones of the second uniform resource locators correspond to the online activity by comparing differences between the at least portions of the ones of the second uniform resource locators and corresponding portions of the first uniform resource locators to a similarity threshold.

9. The apparatus as defined in claim 6, wherein the second uniform resource locators are collected from the second client device in response to the user of the first client device registering an internet protocol address associated with the second client device.

10. The apparatus as defined in claim 6, wherein the processor is to identify the subsequent online activity of the user at the second client device based on portions of the third uniform resource locators matching portions of fourth uniform resource locators collected from the second client device after the cookie is deleted.

11. A tangible computer readable storage medium comprising instructions that, when executed, cause a machine to at least:

collect first uniform resource locators from a first client device, the first client device having a meter;

collect second uniform resource locators from a second client device, the second client device not having a meter;

determine that ones of the second uniform resource locators from the second client device correspond to online activity of a user associated with the first client device based on ones of the first uniform resource locators matching at least portions of the ones of the second uniform resource locators;

in response to determining ones of the second uniform resource locators from the second client device correspond to the online activity of the user associated with the first client device, associate the second client device with the user of the first client device, the associating including setting a cookie associated with the user on the second client device;

after setting the cookie on the second client device, associate third uniform resource locators from the second client device with the online activity of the user associated with the first client device; and after deletion of the cookie from the second client device, use the third uniform resource locators to identify subsequent online activity of the user at the second client device.

12. The tangible computer readable storage medium as defined in claim 11, wherein to determine that the ones of the second uniform resource locators correspond to the online activity, the instructions further cause the machine to determine that at least first domain name portions of the first uniform resource locators match second domain name portions of the ones of the second uniform resource locators.

13. The tangible computer readable storage medium as defined in claim 11, wherein the instructions cause the machine to collect the second uniform resource locators from the second client device in response to the user of the first client device registering an internet protocol address associated with the second client device.

14. The tangible computer readable storage medium as defined in claim 11, wherein the instructions cause the machine to identify the subsequent online activity of the user at the second client device when portions of the third uniform resource locators match portions of fourth uniform resource locators collected from the second client device after the cookie is deleted.

* * * * *